United States Patent
Allen, Jr. et al.

(10) Patent No.: US 11,390,731 B2
(45) Date of Patent: Jul. 19, 2022

(54) PROCESS TO PRODUCE STRAIN HARDENED POLYPROPYLENE

(71) Applicant: ExxonMobil Chemical Patents Inc., Baytown, TX (US)

(72) Inventors: Edward F. Allen, Jr., Houston, TX (US); George J. Pehlert, Houston, TX (US); Roger P. Volmer, Rogers, AR (US); Alan J. Oshinski, League City, TX (US); Sasha P. Schmitt, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 396 days.

(21) Appl. No.: 16/629,676

(22) PCT Filed: May 23, 2018

(86) PCT No.: PCT/US2018/034081
§ 371 (c)(1),
(2) Date: Jan. 9, 2020

(87) PCT Pub. No.: WO2019/013872
PCT Pub. Date: Jan. 17, 2019

(65) Prior Publication Data
US 2020/0325318 A1    Oct. 15, 2020

Related U.S. Application Data

(60) Provisional application No. 62/531,940, filed on Jul. 13, 2017.

(51) Int. Cl.
| | | |
|---|---|---|
| *C08L 23/12* | (2006.01) | |
| *C08J 3/12* | (2006.01) | |
| *C08K 5/14* | (2006.01) | |
| *C08J 9/12* | (2006.01) | |

(52) U.S. Cl.
CPC ............. *C08L 23/12* (2013.01); *C08J 3/12* (2013.01); *C08J 9/122* (2013.01); *C08K 5/14* (2013.01); *C08J 2203/06* (2013.01); *C08L 2203/30* (2013.01)

(58) Field of Classification Search
CPC ......... C08L 23/12; C08L 2203/30; C08J 9/12; C08J 9/122; C08J 2203/06; C08J 9/00; C08J 2323/12; C08K 5/14; C08F 2810/10; C08F 2810/20; C08F 8/00; C08F 110/06; C08F 2/44; C08F 4/6465; C08F 8/06; C08F 2500/04; C08F 2500/12
See application file for complete search history.

(56) References Cited

U.S. PATENT DOCUMENTS

| | | | |
|---|---|---|---|
| 6,051,617 A | * | 4/2000 | Sasaki ............... C08F 255/02 521/139 |
| 6,087,459 A | | 7/2000 | Miro et al. |
| 6,350,828 B1 | | 2/2002 | Takaoka et al. |
| 7,772,346 B2 | | 8/2010 | Meesters et al. |
| 8,080,624 B2 | | 12/2011 | Ito et al. |
| 8,895,685 B2 | | 11/2014 | Klimke et al. |
| 9,068,030 B2 | | 6/2015 | Song et al. |
| 9,200,095 B2 | | 12/2015 | Tran et al. |
| 9,290,600 B2 | | 3/2016 | Prokschi et al. |
| 9,376,549 B2 | | 6/2016 | Klimke et al. |
| 9,410,034 B2 | | 8/2016 | Klimke et al. |
| 9,522,984 B2 | | 12/2016 | Kaneno et al. |
| 9,567,351 B2 | | 2/2017 | Hafner et al. |
| 9,663,648 B2 | | 5/2017 | Farah et al. |
| 10,538,645 B2 | | 1/2020 | Pehlert et al. |
| 2015/0018463 A1 | | 1/2015 | Chikhalikar et al. |
| 2016/0137761 A1 | | 5/2016 | Gahleitner et al. |
| 2017/0210859 A1 | | 7/2017 | Pehlert et al. |

FOREIGN PATENT DOCUMENTS

| | | | |
|---|---|---|---|
| CN | 104974369 A | * | 10/2015 |
| CN | 106432558 A | * | 2/2017 |
| EP | 0985686 A | | 3/2000 |
| EP | 2767559 A | | 8/2014 |
| JP | 2012184303 A | * | 9/2012 |
| WO | 2013/004803 A | | 1/2013 |
| WO | 2014/070384 A | | 5/2014 |
| WO | 2014/070385 A | | 5/2014 |
| WO | 2014/070386 A | | 5/2014 |
| WO | 2016/126429 A | | 8/2016 |
| WO | 2016/162453 A | | 10/2016 |
| WO | 2016/164111 A | | 10/2016 |
| WO | 2017/034759 A | | 3/2017 |

OTHER PUBLICATIONS

Lagendijk, R.P., et al. "Peroxydicarbonate modification of polypropylene and extensional flow properties," vol. 42, Polymer, pp. 10035-10043, 2001.
Gotsis, A. D., et al. "The Effect of Long Chain Branching on the Processability of Polypropylene in Thermoforming," vol. 44, No. 5, Polymer, Engineering and Science p. 973, 2004.
Gotsis, A.D. et al. "Effect of long branches on the rheology of polypropylene," vol. 48, No. 4, J. Rheol. pp. 895-914, 2004.
Borsig, E. et al. "Long chain branching on linear polypropylene by solid state reactions," vol. 44 European Poly. J. pp. 200-212, 2008.

* cited by examiner

*Primary Examiner* — Kara B Boyle
(74) *Attorney, Agent, or Firm* — Vorys, Sater, Seymour and Pease LLP (57) ABSTRACT

A process comprising combining a polymerization catalyst with propylene at a polymerization temperature to produce polypropylene granules having an MFR1, wherein the temperature of the polypropylene granules is maintained at least at the polymerization temperature; mixing the polypropylene granules with an organic peroxide at a temperature of at least the polymerization temperature for a residence time of at least 40 seconds at a temperature below the melting point temperature of the polypropylene granules to form a polypropylene product having an MFR2, wherein MFR1 is greater than MFR2.

25 Claims, 5 Drawing Sheets

PROCESS TO PRODUCE STRAIN HARDENED POLYPROPYLENE

CROSS-REFERENCE OF RELATED APPLICATIONS

This application is a National Phase Application claiming priority to PCT Application Serial No. PCT/US2018/034081 filed May 23, 2018, which claims priority to and the benefit of U.S. Provisional Application No. 62/531,940, filed Jul. 13, 2017, the disclosures of which are incorporated herein by reference.

FIELD OF THE INVENTION

The present disclosure relates to improved processes for producing polypropylene, and in particular to improved methods of solid state blending and post-reactor polymer reactions.

BACKGROUND

The applicability of polypropylenes in industrial operations that involve both shear and extensional flows, including thermoforming, fiber drawing/spinning, blown film, foam, etc., has been limited. This is partially due to its low melt strength and lack of strain hardening in common linear polypropylene. Multiple approaches have been attempted in the industry to improve the melt strength and strain hardening of polypropylenes includes increasing the molecular weight, broadening of the molecular weight distribution, addition of an ultra-high molecular weight tail, and/or the addition of long chain branching (LCB).

It is known that polypropylenes reacted with thermally decomposing free-radical forming agents such as organic peroxides, optionally in the presence of bifunctionally unsaturated monomers, can result in branched and/or cross-linked polypropylene under desirable circumstances. It has been found that for scaling-up from laboratory to commercial plant conditions that the efficiency of the reaction free-radical reaction may not be the same. What is needed is an optimized method for reacting organic peroxides with polypropylene, and in particular, an improved method for solid-solid reactions on a commercial scale.

Related publications include U.S. Pat. Nos. 9,663,648; 9,567,351; 9,522,984; 9,410,034; 9,376,549; 9,290,600; 9,200,095; 9,068,030; 8,895,685; 8,080,624; 7,772,346; 6,350,828; US 2015/018463; US 2016/6137761; WO 2016/164111; WO 2016/162453; and WO 2016/126429; and:

R. P. Lagendijk et al. "Peroxydicarbonate modification of polypropylene and extensional flow properties," in 42 POLYMER 10035-10043 (2001);

A. D. Gotsis et al. "The Effect of Long Chain Branching on the Processability of Polypropylene in Thermoforming," in 44(5) POLYMER ENGINEERING AND SCIENCE 973 (2004);

A. D. Gotsis et al. "Effect of long chain branches on the rheology of polypropylene," in 48(4) J. RHEOL. 895 (2004); and E. Borsig et al. "Long chain branching on linear polypropylene by solid state reactions." in 44 EUROPEAN POLY. J. 200 (2008).

SUMMARY

Disclosed is a process comprising (or consisting essentially of, or consisting of) combining a polymerization catalyst with propylene at a polymerization temperature to produce polypropylene granules having an MFRL, wherein the temperature of the polypropylene granules is maintained at least at the polymerization temperature; mixing the polypropylene granules with an organic peroxide at a temperature of at least the polymerization temperature for a residence time of at least 40 seconds at a temperature below the melting point temperature of the polypropylene granules to form a polypropylene product having an MFR2, wherein MFR1 is greater than MFR2.

Also disclosed is a process comprising (or consisting essentially of, or consisting of) combining a polymerization catalyst with propylene at a polymerization temperature to produce polypropylene granules having an MFR1, wherein the temperature of the polypropylene granules is maintained at least at the polymerization temperature; conveying the polypropylene granules to a homogenizer while maintaining the temperature of the granules at a temperature of at least the polymerization temperature; and mixing the polypropylene granules with an organic peroxide in the homogenizer for a residence time of at least 40 seconds at a temperature below the melting point temperature of the polypropylene granules to form a polypropylene product having an MFR2. Preferably. MFR1 is greater than MFR2.

DETAILED DESCRIPTION

The inventors have discovered that the efficiency of the reaction between polypropylene and a thermally decomposing free-radical forming agent is enhanced by judicious selection of the process conditions including granule temperature, granule size, residence time, atmosphere (e.g., $O_2$ deficient), etc. Reaction efficiency improvements of as much as 20% were demonstrated, allowing for use of a relatively low amount of organic peroxide. This improvement in efficiency is beneficial from a materials handling and cost perspective since a lower concentration of the thermally decomposing free-radical forming agent is needed.

As used herein. "mixing" refers to intimately combining solid polypropylene and organic peroxide, which may preferably be solid. In a preferred embodiment, a homogenizer is used for such mixing. "Homogenizers" are mechanical devices that combine two or more distinct materials, preferably one or all in solid form, by physical methods such as mixing, spinning, agitation, vibration, or some combination thereof. Common homogenizers can be generally divided between horizontal conveyors, in which a screw or screw-like mechanism conveys polymer granules and additive mixtures down the length of the homogenizer, and vertical or horizontal blenders which homogenizes polymer granules and additive mixtures by agitation or some other non-conveying means. Most preferably, the homogenizer maintains the materials being mixed in solid and/or liquid form and does not create a molten material such as by heating a polymer to its melting point temperature.

In any case, blenders can be ribbon-type or paddle-type. Ribbon blenders control mixing and residence time with reverse-flow angle ribbon section(s) and paddle-blenders use reverse flow angle paddles. Though complete solid-solid homogenization is desirable, it has been found that pre-extruder homogenization is not needed to achieve acceptable solid-solid variation. For solid organic peroxides in granule or flake form, a blender is beneficial not only for the homogenization but to increase residence time of the peroxide/granule mixture in the temperature range that the long-chain branching reaction occurs prior to entering the melt section of the extruder, where the temperature is elevated to the point that the organic peroxide produces chain scissioning and has a half-life on the order of milliseconds. Some specific types of homogenizers that can be used include horizontal screw conveyer, horizontal ribbon blender, and horizontal single or twin shaft paddle blender. These may each be adjusted to change the rate of rotation, the number of paddles, the angle of the paddles and/or ribbons, the pitch of the ribbons or screw, and length of travel to effect the solid-liquid or solid-solid reaction.

Thus, in any embodiment is a process comprising (or consisting of, or consisting essentially of) combining a polymerization catalyst with propylene at a polymerization temperature to produce polypropylene granules having an MFR1, wherein the temperature of the polypropylene granules is maintained at least at the polymerization temperature, which can be any desirable temperature depending on the type of catalyst and other process conditions, an example of which is a temperature of at least 50° C.; mixing the polypropylene granules with an organic peroxide at a temperature of at least the polymerization temperature for a residence time of at least 40, or 50, or 60, or 70 seconds at a temperature below the melting point temperature of the polypropylene granules, preferably within a range from 50° C. to 75, or 80, or 85, or 90, or 95, or 100° C., to form a polypropylene product having an MFR2; wherein MFR1 is greater than MFR2. The step of combining the polymerization catalyst and propylene takes place in an environment such as a polymerization reactor that is maintained at a "polymerization temperature" as is described herein.

Described another way is a process comprising (or consisting of, or consisting essentially of) combining a polymerization catalyst with propylene at a polymerization temperature to produce polypropylene granules having an MFR1, wherein the temperature of the polypropylene granules is maintained at least at the polymerization temperature such as at least the polymerization temperature, such as at least 50° C.; conveying the polypropylene granules to a homogenizer while maintaining the temperature of the granules at a temperature of at least 50, or 60, or 70° C.; and mixing the polypropylene granules with an organic peroxide in the homogenizer for a residence time of at least 40, or 50, or 60, or 70 seconds at a temperature below the melting point temperature of the polypropylene granules to form a polypropylene product having an MFR2. Preferably, MFR1 is greater than MFR2.

The polypropylene granules described herein can be produced by any means of olefin polymerization, but are preferably produced from a single catalyst and single stage polymerization process. By "single catalyst", what is meant is that the olefins are contacted with a catalyst derived from the same or similar preparation, thus having the same or similar homogeneous composition such as a single Ziegler-Natta type of catalyst, metallocene catalyst, or other catalyst. Most preferably, the single catalyst is a Ziegler-Natta catalyst with one or more external electron donors in a slurry polymerization system, preferably two external donors whose overall concentration can be varied, and/or they can be varied with respect to one another.

In any embodiment the polymerization catalyst is a Ziegler-Natta catalyst that preferably includes a solid titanium catalyst component comprising titanium as well as magnesium, halogen, at least one non-aromatic "internal" electron donor, and at least one, preferably two or more "external" electron donors. The solid titanium catalyst component, also referred to as a Ziegler-Natta catalyst, can be prepared by contacting a magnesium compound, a titanium compound, and at least the internal electron donor. Examples of the titanium compound used in the preparation of the solid titanium catalyst component include tetravalent titanium compounds having the formula $Ti(OR_n)X_{4-n}$, wherein "R" is a hydrocarbyl radical, "X" is a halogen atom, and n is from 0 to 4. For purposes of this disclosure, a hydrocarbyl radical is defined to be C1 to C20 radicals, or C1 to C10 radicals, or C6 to C20 radicals, or C7 to C21 radicals that may be linear, branched, or cyclic where appropriate (aromatic or non-aromatic).

Preferably, the halogen-containing titanium compound is a titanium tetrahalide, most preferably titanium tetrachloride. Preferably, the magnesium compound to be used in the preparation of the solid titanium catalyst component includes a magnesium compound having reducibility and/or a magnesium compound having no reducibility. Suitable magnesium compounds having reducibility may, for example, be magnesium compounds having a magnesium-carbon bond or a magnesium-hydrogen bond. Suitable examples of such reducible magnesium compounds include dimethyl magnesium, diethyl-magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. In combination with the magnesium compound, the titanium-based Ziegler-Natta catalyst is said to be supported.

In any embodiment the Ziegler-Natta catalysts are used in combination with a co-catalyst. Compounds containing at least one aluminum-carbon bond in the molecule may be utilized as the co-catalysts, also referred to herein as an organoaluminum co-catalyst. Suitable organoaluminum compounds include organoaluminum compounds of the general formula $R^1_m Al(OR^2)_n H_p X_q$, wherein $R^1$ and $R^2$ are identical or different, and each represents a C1 to C15 hydrocarbyl radical, or C1 to C4 hydrocarbon radical; "X" represents a halogen atom; and "m" is 1, 2, or 3; "n" is 0, 1, or 2; "p" is 0, 1, 2, or 3; and "q" is 0, 1, or 2; and wherein m+n+p+q=3. Other suitable organoaluminum compounds include complex alkylated compounds of metals of Group I of the Period Table (lithium, etc.) and aluminum represented by the general formula $M^1 AlR^1_4$, wherein M is the Group I metal such as Li, Na, or K, and $R^1$ is as defined in formula (2). Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl-aluminum ethoxide and dibutyl aluminum ethoxide; alkyl aluminum sesquialkoxides such as ethyl aluminum sesquiethoxide and butyl aluminum sesqui-butoxide.

Electron donors are present with the metal components described above in forming the catalyst suitable for producing the polypropylenes described herein. Both "internal" and "external" electron donors are desirable for forming the catalyst suitable for making the polypropylene described herein. More particularly, the internal electron donor may be used in the formation reaction of the catalyst as the transition metal halide is reacted with the metal hydride or metal alkyl. Examples of suitable internal electron donors include amines, amides, ethers, esters, ketones, nitriles, phosphines, stilbenes, arsines, phosphoramides, thioethers, thioesters, aldehydes, alcoholates, and salts of organic acids. More preferably, the one or more internal donors are non-aromatic. The non-aromatic internal electron donor may comprise an aliphatic amine, amide, ester, ether, ketone, nitrile, phosphine, phosphoramide, thioethers, thioester, aldehyde, alcoholate, carboxylic acid, or a combination thereof. Even more preferably, the non-aromatic internal electron donor(s) comprises a C1 to C20 diester of a substituted or unsubstituted C2 to C10 dicarboxylic acid.

In any embodiment, two or more external electron donors are used in combination with the Ziegler-Natta catalyst. The external electron donors may comprise an organic silicon compound of the general formula $R^1{}_n Si(OR^2)_{4-n}$, wherein $R^1$ and $R^2$ independently represent a hydrocarbyl radical and "n" is 1, 2, or 3. Examples of the suitable organic silicon compounds include trimethylmethoxysilane, trimethylethoxysilane, dimethyldimethoxysilane, dimethyldimethoxysilane, dimethyldiethoxysilane, diiso-propyldiethoxysilane, t-butylmethyl-n-diethoxysilane, t-butylmethyldiethoxvsilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxysilane, dicyclohexyldiethoxysilane, cyclohexylmethyl-dimethoxysilane, cyclohexylmethyldiethoxysilane, ethyltrimethoxysilane, ethyltriethoxysilane, vinyl-trimethoxysilane, methyltrimethoxysilane, n-propyl-triethoxysilane, decyltrimethoxysilane, decyltriethoxysilane, phenyltrimethoxysilane, [gamma]-chloropropyltri-methoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, vinyltributoxysilane, cyclo-hexyltrimethoxysilane, cyclohexyltriethoxysilane, 2-norbomanetriethoxysilane, 2-norbornanemethyldimethoxysilane, ethyl silicate, butyl silicate, trimethyl-phenoxysilane, methylallyloxysilane, vinyltris(beta-methoxyethoxysilane), vinyltriacetoxysilane, dimethyltetraethoxydisiloxane, tetraethoxysilane, methylcyclohexyldimethoxysilane, propyltriethoxysilane, and/or dicyclopentyldimethoxysilane.

Preferably the external electron donors are selected from any one or more of methyltrimethoxysilane, ethyltrimethoxysilane, ethyltriethoxysilane, vinyltriethoxysilane, propyltrimethoxysilane, decyltrimethoxysilane, decyltriethoxysilane, propyltriethoxysilane, butyltriethoxysilane, phenyltriethoxysilane, vinyltrimethoxysilane, vinyltributoxysilane cyclohexyltrimethoxysilane, tetraethoxysilane, methylcyclohexyldimethoxysilane, propyltriethoxysilane, and/or dicyclopentyldimethoxysilane.

In any embodiment, the production of the polypropylene granules preferably includes the use of two external electron donors, most preferably simultaneously. Suitable methods for using such external electron donors is disclosed in U.S. Pat. Nos. 6,087,459, and 6,686,433. The two external electron donors may be selected from any of the external electron donors described herein. But in a particular embodiment, the first external electron donor has the formula $R^1 Si(OR^2)_2$ wherein each $R^1$ is independently a C1 to C10 hydrocarbyl radical in which the carbon adjacent to the silicon atom is a secondary or a tertiary carbon atom, and wherein each $R^2$ is independently a C1 to C10 hydrocarbyl radical; and the second external electron donor has the formula $R^3{}_n Si(OR^4)_{4-n}$, wherein each $R^3$ and $R^4$ are independently a C1 to C10 hydrocarbyl radical, and "n" is 1, 2, or 3; wherein the second external electron donor is different than the first external electron donor. The combined concentration of external electron donors can be present with the catalyst and monomer(s) in the polymerization reactor to within a range from 10, or 20 ppm to 80, or 100, or 120 ppm.

The concentration of the catalyst system in the polymerization reactor(s) may be from 0.01 to 200 millimoles, or more preferably from 0.05 to 100 millimoles, calculated as a titanium atom, per liter of an inert hydrocarbon medium. The organoaluminum co-catalyst may be present in an amount sufficient to produce from 0.1 to 500 g, or more preferably from 0.3 to 300 g, of a polymer per gram of the titanium catalyst present, and may be present at from 0.1 to 100 moles, or more preferably from 0.5 to 50 moles, per mole of the titanium atom present in the catalyst component.

Examples of suitable means of polymerization include contacting the catalyst and olefins in a gas phase reactor, stirred tank reactor, loop reactor, or other reactors known in the art. The polymerization may take place in the gas phase, as a solution, or as a slurry. In any case, hydrogen may be present in the reactor to modulate the molecular weight of the polypropylene being produced. In any embodiment, the hydrogen, if combined with the single catalyst during the polymerization, is combined at a constant level. This means that the total concentration of hydrogen in the reactor is held constant during the production of the polypropylene.

The polymerization is most preferably a "single stage" polymerization process, meaning that the olefins and catalyst, and optional hydrogen are contacted under the same or similar conditions throughout the production of the polypropylene granules, such as in a single reactor, or multiple reactors in parallel or series, held at a constant level of temperature, pressure, monomer concentration, and hydrogen concentration, where no parameter changes by more than ±5%, or ±10% in going from one reactor to the next. Thus, for example, a polymerization is single stage even if performed in two or more loop slurry reactors in parallel if the reactor conditions are held at a constant (±10%) level.

The phrases "slurry polymerization process" or "slurry polymerization reactor" refer to a process or reactor that handles polymer that is only partly dissolved or not dissolved at all in the medium, either monomer, solvent, or both, typically having at least 20 wt % polymer, by weight of the polymer, monomers and diluent, suspended or not dissolved. In a typical solution or slurry polymerization process, catalyst components, solvent, monomers and hydrogen (when used) are passed under pressure to one or more polymerization reactors. Catalyst components may be passed in the inventive processes to the polymerization reactor as a mixture in aliphatic hydrocarbon solvent, in oil, a mixture thereof, or as a dry powder. Most preferably, the polymerization process is carried out using propylene as the only solvent.

In any case, the temperature of the reactor is controlled by the rate of catalyst addition (rate of polymerization), the temperature of the solvent/monomer feed stream and/or the use of heat transfer systems. For olefin polymerization, reactor temperatures can range from 50 to 120° C. or more, while pressures are generally higher than 300 psig, or within a range from 300 psig to 1000, or 1200 psig. These process conditions favor in-situ catalyst activation since high temperature enhances the solubility of catalysts and activators in aliphatic hydrocarbon solvent. In any embodiment, the polymerization temperature, that is, the temperature at which the polymerization reaction is conducted such as the environment of a polymerization vessel or reactor, is preferably at least 50, or 60, or 70° C., or within a range from 50, or 60, or 70, or 80, or 90, or 100, or 120° C. to 130, or 140, or 150, or 160, or 170° C. The vessel or reactor can be a loop reactor, or stirred tank reactor, a gas phase reactor, or other reactor as is known in the art.

The propylene and, if present, ethylene and/or other C4 to C12 α-olefin, are dissolved/dispersed in the solvent either prior to being passed to the polymerization reactor (or for gaseous monomers, the monomer may be passed to the reactor so that it will dissolve in the reaction mixture). Prior to mixing, the solvent and monomers are generally purified to remove potential catalyst poisons. The feedstock may be heated or cooled prior to delivery to the first reactor. Additional monomers and solvent may be added to the second reactor, and it may be heated or cooled. Preferably the solvent is the propylene monomer itself.

The catalysts/activators can be passed to one polymerization reactor or split between two or more reactors. In solution or slurry polymerization, polymer produced is molten and remains dissolved or partially dissolved in the solvent under reactor conditions, forming a polymer solution. The catalyst may be passed to the reactor in solid form or as a slurry/suspension in a solvent. Alternatively, the catalyst suspension may be premixed with the solvent in the feed stream for the polymerization reaction. Catalyst can be activated in-line, or by an activator with which it is co-supported. In some instances premixing is desirable to provide some reaction time prior to the catalyst components entering the polymerization reactor, which may be in the presence or absence of the monomer to effect what is known as "pre-polymerization," but this step is preferably absent. The catalyst activity is preferably 20,000 kg polymer per kg of catalyst or more, more preferably 50.000 kg polymer per kg of catalyst or more, even more preferably 100,000 kg polymer per kg of catalyst or more.

In any embodiment, the solution or slurry polymerization processes of this disclosure includes a stirred reactor system comprising one or more stirred polymerization reactors. Generally the reactors should be operated under conditions to achieve a thorough mixing of the reactants. In a dual reactor system, the reactors may operate at the same or different temperatures and fluidly connected in series, but preferably operate at the same temperature or within ±2, or ±4° C. of one another as measured by an internal thermocouple within the polymerization medium or inside wall of each reactor, consistent with one another. The residence time in each reactor will depend on the design and the capacity of the reactor. Preferably, the two or more reactors otherwise operate under the same conditions.

In any embodiment, the solution or slurry polymerization process is carried out in one or more loop-type of reactors, preferably two fluidly connected in series. Such reactor systems include a single reactor and multiple reactors in series or parallel configuration, such as that disclosed in US 2007/0022768. The solvent/monomer, preferably simply propylene, flow in these reactors is typically maintained using pumps and/or pressure systems, and may operate continuously by having monomer and catalyst feed at one point and extracting the forming polymer from another point, preferably downstream therefrom. The conditions of temperature, catalyst concentration, hydrogen concentration, and monomer concentration may be the same or different in each loop reactor and may be tailored as necessary to suit the desired end product.

In any embodiment, the solution polymerization process of this disclosure uses heat exchanger types of reactors where the polymerization. The reactors can be one or more shell and tube type of heat exchangers, or one or more spiral type of heat exchanger.

In any case, the polypropylene solution is then discharged from the reactor as an effluent stream and the polymerization reaction is quenched, typically with coordinating polar compounds, to prevent further polymerization. On leaving the reactor system the polymer solution is passed through a heat exchanger system on route to a devolatilization system and polymer finishing process. Under certain conditions of temperature and pressure, the polymer solution can phase separate into a polymer lean phase and a polymer rich phase. The polypropylene granules can be recovered from the effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the finishing procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline, and/or stabilizing agents such as tocopherols or lactones, or other agents as disclosed in WO 2009/007265.

The "polypropylene granules" are the solid polypropylene product of the polymerization reaction between the polymerization catalyst, most preferably a Ziegler-Natta catalyst and two external donors, and propylene, with optional comonomers such as ethylene, 1-butene, 1-hexene, and/or 1-octene. The resulting polypropylene granules can be homopolymers of propylene-derived units, or copolymers of propylene-derived units within a range from 0.1 to 4, or 5 wt %, by weight of the polymer, of ethylene or C4 to C12 α-olefin derived units. The polypropylene granules, preferably produced as described, are then mixed with an organic peroxide to produce a polypropylene product. The "polypropylene product" is the polypropylene reaction product between the organic peroxide and the polypropylene granules prior to any melt blending step. The polypropylene product, and polypropylene pellets described herein are expected to have the same comonomer content as the granules.

The "organic peroxide" is any organic compound comprising at least one —(O)COO— group and/or —O—O— group, and preferably possesses a 1 hour half-life temperature ($^1T_{1/2}$) of less than 100, or 85, or 75, or 65° C. as determined in an aromatic and/or halogenated aromatic solvent, preferably having a ($^1T_{1/2}$) within a range from 25, or 35, or 45° C. to 65, or 75, or 85, or 100° C.

In any embodiment, the organic peroxide is selected from compounds having one or more structures selected from (a) and (b):

wherein each "R" group is independently selected from the group consisting of hydrogen, C1 or C5 to C24 or C30 linear alkyls, C1 or C5 to C24 or C30 secondary alkyls, C1 or C5 to C24 or C30 tertiary alkyls, C7 to C34 alkylaryls, C7 to C34 arylalkyls, and substituted versions thereof. Most preferably, the organic peroxide is selected from the structures represented by formula (a). By "substituted" what is meant are hydrocarbon "R" groups having substituents such as halogens, carboxylates, hydroxyl groups, amines, mercaptans, and phosphorous containing groups. In a particular embodiment, each "R" group is independently selected from C8 to C20 or C24 linear, secondary, or tertiary alkyls, such as octyl, decyl, lauryl, myristyl, cetyl, arachidyl, behenyl, erucyl and ceryl groups and linear, secondary or tertiary versions thereof. Specific, non-limiting examples of suitable organic peroxides include di-sec-butyl peroxydicarbonate, diisopropyl peroxydicarbonate, dicyclohexyl peroxydicarbonate, di(4-tert-butylcyclohexyl) peroxydicarbonate, dicetyl peroxydicarbonate, dibutyl peroxydicarbonate, di(2-ethylhexyl) peroxydicarbonate, didodecyl peroxydicarbonate, diicosyl peroxydicarbonate, and ditetracosyl peroxydicarbonate.

In any embodiment, the melting point of the organic peroxide is within a range from 30, or 40, or 45° C. to 55, or 65, or 75° C. Also in any embodiment the solid, neat organic peroxide has a bulk density within a range from 0.4, or 0.5 to 0.7, or 0.8 g/cm³. In any embodiment the organic peroxide is in the form of solid granules, flakes, particles, powder, or other solid "granular" form. It may be used in its neat form or as a masterbatch with an inert polymer matrix, or solution with an inert solvent. The size and shape of the organic peroxide can be tailored by low temperature methods such as prilling or compaction, or other known means.

The formation of the polypropylene pellets described herein are effected in any embodiment by melt blending the polypropylene granules or polypropylene product with the organic peroxide, especially through shear forces and applied radiative heating during blending/extrusion, to a melt temperature of at least the melting point of the linear polypropylene, such as at least 140, or 150, or 160° C., or within a range from 140, or 150, or 160° C. to 180, or 200, or 220, or 240, or 260, or 280, or 300° C. Suitable means include a single or twin screw extruder or Brabender- or Banbury-type apparatus.

The polypropylene pellets produced from the polymerization process are preferably conveyed to a homogenizer. In any embodiment, cooling is absent from the conveying process, and most preferably the pellets, still heated from the polymerization reaction, are maintained at the same or even higher temperature. In particular, though there may be a cooling apparatus present with the capability of cooling the polypropylene granules, it is not used for such purpose and no external cooling is applied to the granules, and most preferably the granules are kept at the same or higher temperature as when they exit the polymerization reactor. Thus, preferably the mixing step takes place after the combining step without cooling the polypropylene granules. In any embodiment the polypropylene granules are heated to a temperature within a range from 50° C. to 75, or 80, or 85, or 90, or 95, or 100° C. prior to (and/or during) mixing with the organic peroxide, meaning that the granules are exposed to a temperature within the named range, such as the homogenizer, etc.

In any embodiment, the amount of organic peroxide that is combined, contacted or otherwise "mixed" with the polypropylene granules is within a range from 0.4, or 0.5, or 0.6 wt % to 0.8, or 1.0, or 1.2, or 1.4, or 1.5 wt % by weight of the polypropylene granules and organic peroxide. Preferably, the mixing occurs in the presence of an inert gas, for instance in the presence of a flow of nitrogen or argon gas. In any embodiment, the mixing occurs in a homogenizer at a rate of at least 50,000, or 60,000, or 80,000 lbs of polymer/hour.

Thus, the overall process starts with forming the polypropylene granules, which are the reactor grade, untreated polymer from the polymerization reaction, followed by mixing the pellets with organic peroxide to form a polypropylene product, followed by melt blending to form polypropylene pellets. The overall process, and/or individual steps, is preferably carried out without the need for certain added steps and/or agents.

In particular, in any embodiment, bifunctional agents are absent during the mixing, or preferably during any stage of the process. By "bifunctional agents" what is meant are agents having at least two reactive moieties capable of forming a chemical bond between two different polymer chains, such as carbon-carbon double bonds in divinylbenzene, isoprene, or polyisobutylene and other conjugated dienes. Other bifunctional agents are those with moieties such as hydroxyl, mercaptans, sulfide, and imide groups including 1,4-benzenediol and furfuryl sulphide. Also, in any embodiment irradiation is absent, such as electron beam, ultra-violet radiation, gamma-radiation, and other such high energy radiation. Also, preferably no solvent, such as acetone, toluene, propane, propylene, isobutane, or hexanes were present during the mixing or most preferably at any stage of the process.

It is desirable to control the particle size of the polypropylene granules coming from the reactor. One method to accomplish this is by controlling the particle size of the catalyst itself. Thus in any embodiment, the average particle size of the catalyst can be reduced from an average diameter of 50 to 80 micrometers to an average diameter of less than 50, or 40 micrometers. In any embodiment, the average particle size of the polypropylene granules is reduced from an average diameter of at least 1500, or 2000 micrometers to an average diameter of less than 1000, or 800 micrometers.

Finally, the use of a cooling apparatus or any type of cooling means is absent in the process, either any of the individual steps, or all of the steps. Thus, the combining and mixing steps preferably occur at or above the polymerization temperature, where heating can be applied in the mixing step to increase the temperature further.

The polypropylene pellets resulting from the inventive processes have a number of desirable features. In any embodiment the polypropylene pellets have a melt strength (pull-off-force) of at least 25, or 30 cN, or within a range from 25, or 30 cN to 40, or 45, or 50, or 60, or 65, or 70 or 80 cN. Most preferably, the melt strength is within this range even when as little as 0.6 wt % to 1, or 1.2 wt % organic peroxide is mixed with the granules.

The polypropylene pellets also exhibit strain hardening as evidences by an increase in the viscosity as the melt is drawn in a rheometer, as described below, to at least a viscosity of 10,000, or 20,000, or 40,000 Pa above the linear-viscoelastic (LVE) range at a rate within a range from 1 to 10 sec$^{-1}$, or within a range from 10,000, or 20,000, or 40,000 Pa to 100,000, or 200,000, or 500,000 Pa. Most preferably, the pellets exhibit such strain hardening values even when as little as 0.6 wt % to 1, or 1.2 wt % organic peroxide is mixed with the granules.

The mixing of the polypropylene granules and subsequent melt blending imparts certain properties to the resulting polypropylene product and pellets. In any embodiment, polypropylene granules have a branching index (g'vis) of greater than 0.97, wherein the polypropylene product and pellets have a g'vis value of 0.97 or less. Also in any embodiment, the polypropylene product and pellets have a melt strength (pull-of-force) of at least 25, or 30 cN; or within a range from 25, or 30 cN to 40, or 45, or 50, or 60, or 65, or 70 or 80 cN. Typically, the polypropylene granules have a melt strength of less than 25, or 20 cN.

In any embodiment, the polypropylene pellets exhibit a strain hardening index (SHI, strain rate of 1 sec$^{-1}$, 190° C.) of at least 1.5, or 2, or 3 or within a range from 1.5, or 2, or 3 to 7, or 8, or 9 when calculated as the ratio of the strain at an apparent elongational speed of 3 sec$^{-1}$ divided by the strain at the elongational speed of 1 sec$^{-1}$ ($\varepsilon_3/\varepsilon_1$), which is essentially the slope of the extensional viscosity versus strain rate plots in the region of linear increase relative to the LVE. The polypropylene granules exhibit a SHI of less than 1.5.

In any embodiment, the polypropylene granules or pellets have a melt flow rate (MFR) within a range from 1.5, or 2 g/10 min to 4, or 6, or 10, or 20, or 40, or 50 g/10 min. The pellets preferably have a lower MFR (higher number and weight average molecular weight) than the granules, as the pellets are the product of the reactive extrusion between the granules and organic peroxide.

In any embodiment, the polypropylene pellets have a molecular weight distribution (Mw/Mn) of greater than 6, or 8, or 10, or within a range from 6, or 8, or 10, or 12 to 18, or 20, or 24, or 28. In any embodiment, the polypropylene pellets have an Mz/Mw value of at least 6, or 8, or 10, or 12, or 14, or within a range from 6, or 8, or 10, or 12, or 14 to 18, or 20, or 24, or 28.

The polypropylene pellets thus produced can be formed into useful articles. For instance, in any embodiment a foamed article can be formed from the polypropylene or polypropylene in a blend with another polymer and/or additive (e.g., filler, anti-oxidant, etc.). Foaming agents useful in forming foamed articles described herein may be normally gaseous, liquid or solid compounds or elements, or mixtures thereof. These foaming agents may be characterized as either physically-expanding or chemically decomposing. Of the physically expanding foaming agents, the term "normally gaseous" is intended to mean that the expanding medium employed is a gas at the temperatures and pressures encountered during the preparation of the foamable compound, and that this medium may be introduced either in the gaseous or liquid state as convenience would dictate. Such agents can be added to the polypropylenes by blending the dry polymer with the foaming agent followed by melt extrusion, or by blending the agents in the polymer melt during extrusion. The foaming agent, especially gaseous agent, may be blended with the polymer melt as it exits the melt extruder or mold that is used for forming the foamed articles. The concentration of the foaming agent may be within a range from 100, or 200, or 500 ppm to 1000, or 200, or 3000, or 4000, or 5000 ppm within the polypropylene.

Included among exemplary, normally gaseous and liquid foaming agents are the halogen derivatives of methane and ethane, such as methyl fluoride, methyl chloride, difluoromethane, methylene chloride, perfluoromethane, trichloromethane, difluoro-chloromethane, dichlorofluoromethane, dichlorodifluoromethane, trifluorochloromethane, trichloromonofluoromethane, ethyl fluoride, ethyl chloride, 2,2,2-trifluoro-1,1-dichloroethane, 1,1,1-trichloroethane, difluorotetrachloroethane, 1,1-dichloro-1-fluoroethane, 1,1-difluoro-1-chloroethane, dichloro-tetrafluoroethane, chlorotrifluoroethane, trichlorotrifluoroethane, 1-chloro-1,2,2,2-tetrafluoroethane, 1,1-difluoroethane, 1,1,1-trifluoroethane, 1,1,1,2-tetrafluoroethane, perfluoroethane, pentafluoroethane, 2,2-difluoropropane, 1,1,1-trifluoropropane, perfluoropropane, dichloropropane, difluoropropane, chloroheptafluoropropane, dichlorohexafluoropropane, perfluorobutane, perfluorocyclobutane, sulfur-hexafluoride, and mixtures thereof. Other normally gaseous and liquid foaming agents that may be employed are hydrocarbons and other organic compounds such as acetylene, ammonia, butadiene, butane, butene, isobutane, isobutylene, dimethylamine, propane, dimethylpropane, ethane, ethylamine, methane, monomethylamine, trimethylamine, pentane, cyclopentane, hexane, propane, propylene, alcohols, ethers, ketones, and the like. Inert gases and compounds, such as nitrogen, argon, neon or helium, can also be used as foaming agents.

Solid, chemically decomposable foaming agents, which decompose at elevated temperatures to form gasses, can be used to expand the polypropylenes. In general, the decomposable foaming agent will have a decomposition temperature (with the resulting liberation of gaseous material) from 130° C. to 200, or 250, or 300, or 350° C. Exemplary chemical foaming agents include azodicarbonamide, p,p'-oxybis(benzene) sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, and other azo, N-nitroso, carbonate and sulfonyl hydrazide compounds as well as various acid/bicarbonate compounds which decompose when heated. Representative volatile liquid foaming agents include isobutane, difluoroethane or blends of the two. For decomposable solid foaming agents, azodicarbonamide is preferred, while for inert gasses, carbon dioxide is preferred.

The art of producing foam structures is known, and those processes used for, for example, polystyrene, are useful for the polypropylene pellets described herein. The foamed articles of the present invention may take any physical configuration known in the art, such as sheet, plank, other regular or irregular extruded profile, and regular or irregular molded bun stock. Exemplary of other useful forms of foamed or foamable objects known in the art include expandable or foamable particles, moldable foam particles, or beads, and articles formed by expansion and/or consolidation and fusing of such particles. In any embodiment the foamable article or polypropylenes may be cross-linked prior to expansion, such as for the process of free-radical initiated chemical cross-linking or ionizing radiation, or subsequent to expansion. Cross-linking subsequent to expansion may be effected if desired by exposure to chemical cross-linking agents or radiation or, when silane-grafted polymers are used, exposure to moisture optionally with a suitable silanolysis catalyst.

The polypropylene pellets disclosed herein can be used to make foamed structures having any desired density, but preferably a density within the range from 0.1 to 0.6 g/cm$^3$. For certain applications that require higher density such as structural components or automotive components, a lower melt strength polypropylene can be used alone or blended with a higher melt strength polypropylene to obtain a polypropylene that can form foam densities within a range from 0.4 to 0.5 g/cm$^3$, for example. For lower foam density applications such as in food containers, the higher melt strength polypropylenes described herein can be used alone or also blended to adjust the foam density to within, for example, a foam density of 0.1 to 0.3 g/cm$^3$. Thus, for example, polypropylene granules (reactor grade PP) can be blended with polypropylene pellets (organic peroxide treated) to create any desired foaming density for a particular end use.

Methods of combining the various ingredients of the foamable polypropylenes include but are not limited to melt-blending, diffusion-limited imbibition, liquid-mixing, and the like, optionally with prior pulverization or other particle-size reduction of any or all ingredients. Melt-blending may be accomplished in a batchwise or continuous process, and is preferably carried out with temperature control. Furthermore, many suitable devices for melt-blending are known to the art, including those with single and multiple Archimedean-screw conveying barrels, high-shear "Banbury" type mixers, and other internal mixers. The object of such blending or mixing is to provide a uniform mixture. One or more components may be introduced in a step-wise fashion, either later during an existing mixing operation, during a subsequent mixing operation or, as would be the case with an extruder, at one or more downstream locations into the barrel.

Expandable or foamable polypropylenes will have a foaming agent incorporated therein, such as a decomposable or physically expandable chemical blowing agent, so as to effect the expansion in a mold upon exposure of the composition to the appropriate conditions of heat and, optionally, the sudden release of pressure. The polypropylenes find many uses as foamed articles including automotive components, insulation and other construction components, food containers, sports equipment, and other domestic and commercial uses.

The polypropylenes pellets can also be thermoformed to make useful thermoformed articles. Thermoforming is a manufacturing process where the polypropylene sheet is heated to a pliable forming temperature, formed to a specific shape in a mold, and trimmed to create a usable product. The sheet, or "film" when referring to thinner gauges and certain material types, is heated in an oven to a high-enough temperature that permits it to be stretched into or onto a mold and cooled to a finished shape. Its simplified version is vacuum forming. The polypropylenes described herein can desirably be formed into films or sheets suitable for thermoforming processes.

In any embodiment, a small tabletop or lab size machine can be used to heat small cut sections of polypropylene sheet and stretch it over a mold using vacuum. This method is often used for sample and prototype parts. In complex and high-volume applications, very large production machines can be utilized to heat and form the polypropylene sheet and trim the formed parts from the sheet in a continuous high-speed process. The polypropylenes described herein are suitable for both types of thermoforming.

One desirable type of thermoforming is thin-gauge thermoforming. Thin-gauge thermoforming is primarily the manufacture of disposable cups, containers, lids, trays, blisters, clamshells, and other products for the food, medical, and general retail industries. Thick-gauge thermoforming includes parts as diverse as vehicle door and dash panels, refrigerator liners, utility vehicle beds, and plastic pallets. Heavy-gauge forming utilizes the same basic process as continuous thin-gauge sheet forming, typically draping the heated plastic sheet over a mold. Many heavy-gauge forming applications use vacuum only in the form process, although some use two halves of mating form tooling and include air pressure to help form.

In any embodiment, a sheet comprising (or consisting essentially of) the polypropylene is fed from a roll or from an extruder into a set of indexing chains that transport the sheet through an oven for heating to forming temperature. The heated sheet then indexes into a form station where a mating mold and pressure-box close on the sheet, with vacuum then applied to remove trapped air and to pull the material into or onto the mold along with pressurized air to form the plastic to the detailed shape of the mold. Plug-assists are typically used in addition to vacuum in the case of taller, deeper-draw formed parts in order to provide the needed material distribution and thicknesses in the finished parts. In any case, after a short cycle, a burst of reverse air pressure can be actuated from the vacuum side of the mold as the form tooling opens to break the vacuum and assist the formed parts off of, or out of, the mold. A stripper plate may also be utilized on the mold as it opens for ejection of more detailed parts or those with negative-draft, undercut areas. The polypropylene sheet containing the formed parts then indexes into a trim station, where a die cuts the parts from the remaining sheet web, or indexes into a separate trim press where the formed parts are trimmed. The sheet web remaining after the formed parts are trimmed is typically wound onto a take-up reel or fed into an inline granulator for recycling.

Generally, the polypropylenes made using the inventive processes herein find use in making many thermoformed articles such as automotive components, construction components, electronic devices, medical equipment, sports equipment, food containers, appliances, and other domestic and commercial uses. Similarly, the polypropylenes can find use thermoformed articles made from injection molding, blow molding, and rotational molding processes.

The various descriptive elements and numerical ranges disclosed herein for the inventive processes described herein can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

Melt Flow Rates.

All melt flow rates (MFR) were determined using ASTM D1238 at 2.16 kg and 230° C. Measurements took place using polypropylene having the additives listed below.

Branching Index.

The branching indexes and molecular weights were (or can be) determined by using a high temperature GPC (Agilent PL-220), equipped with three in-line detectors, a differential refractive index detector ("DRI"), a light scattering ("LS") detector, in conjunction with a viscometer. Detector calibration is described in a paper by T. Sun, P.

Brant, R. R. Chance, and W. W. Graessley, in 34(19) MACROMOLECULES. 6812-6820 (2001) and references therein. Three Agilent PLgel 10 μm Mixed-B LS columns were used for the GPC tests herein. The nominal flow rate was 0.5 mL/min, and the nominal injection volume was 300 μL. The various transfer lines, columns, viscometer and differential refractometer (the DRI detector) were contained in an oven maintained at 145° C. Solvent for the experiment was prepared by dissolving 6 grams of butylated hydroxytoluene as an antioxidant in 4 liters of Aldrich reagent grade 1,2,4-trichlorobenzene ("TCB"). The TCB mixture was then filtered through a 0.1 μm polytetrafluoroethylene filter. The TCB was then degassed with an online degasser before entering the GPC. Polymer solutions were prepared by placing dry polymer in a glass container, adding the desired amount of TCB, then heating the mixture at a temperature of 160° C. with continuous shaking for about 2 hours. All quantities were measured gravimetrically. The TCB densities used to express the polymer concentration in mass/volume units were 1.463 g/ml at 23° C. and 1.284 g/ml at 145° C. The injection concentration was from 0.5 to 2.0 mg/ml, with lower concentrations being used for higher molecular weight samples. Prior to running each sample the DRI detector and the viscometer were purged. The flow rate in the columns was then increased to 0.5 ml/minute, and the DRI was allowed to stabilize for 8 hours before injecting the first sample. The LS laser was turned on at least 1 to 1.5 hours before running the samples. The concentration, c, at each point in the chromatogram was calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI, and (dn/dc) is the incremental refractive index for the system. The refractive index "n" is 1.500 for TCB at 145° C. and λ is 690 nm. Units of molecular weight are expressed in kg/mole or g/mole, and intrinsic viscosity is expressed in dL/g.

The LS detector was a Wyatt Technology High Temperature Dawn Heleos. The molecular weight, M, at each point in the chromatogram was determined by analyzing the LS output using the Zimm model for static light scattering (W. Burchard & W. Ritchering, "Dynamic Light Scattering from Polymer Solutions," in 80 PROGRESS IN COLLOID & POLYMER SCIENCE, 151-163 (Steinkopff, 1989)) and determined using the following equation:

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, "c" is the polymer concentration determined from the DRI analysis, $A_2$ is the second virial coefficient, $P(\theta)$ is the form factor for a mono-disperse random coil, and $K_o$ is the optical constant for the system, as set forth in the following equation:

$$K_o = \frac{4\pi^2 n^2 (dn/dc)^2}{\lambda^4 N_A},$$

where $N_A$ is Avogadro's number, and (dn/dc) is the incremental refractive index for the system, which takes the same value as the one obtained from DRI method, and the value of "n" is as above. The error in measuring the molecular weights give values of Mn, Mw and Mz that are ±5%.

A high temperature Viscotek Corporation viscometer, which has four capillaries arranged in a Wheatstone bridge configuration with two pressure transducers, was used to determine specific viscosity and branching. One transducer measures the total pressure drop across the detector, and the other, positioned between the two sides of the bridge, measures a differential pressure. The specific viscosity ($\eta_S$) for the solution flowing through the viscometer was calculated from their outputs. The intrinsic viscosity, [η], at each point in the chromatogram was calculated from the following equation:

$$\eta_S = c[\eta] + 0.3(c[\eta])^2,$$

where "c" is concentration and was determined from the DRI output. The average intrinsic viscosity, $[\eta]_{avg}$, of the sample was calculated using the following equation:

$$[\eta]_{avg} = \frac{\sum c_i [\eta]_i}{\sum c_i},$$

where the summations are over the chromatographic slices, i, between the integration limits. For data processing, the Mark-Houwink constants used were K=0.000579 and a=0.695.

The branching index (g'vis or simply g') is defined as the ratio of the intrinsic viscosity of the branched polymer to the intrinsic viscosity of a linear polymer of equal molecular weight and same composition. The branching index g' is defined mathematically as:

$$g' = \frac{[\eta]_{avg}}{k M_v^\alpha}.$$

The intrinsic viscosity of the linear polymer of equal molecular weight and same composition was calculated using the Mark-Houwink equation. For purposes of this invention and claims thereto, α=0.695 and k=0.000579 for linear polyethylene homopolymers are used. Linear polyethylene homopolymer was used for g' calculation without considering the comonomer content. The $M_v$ is the viscosity-average molecular weight based on molecular weights determined by LS analysis.

Extensional Viscosity.

Strain hardening was evidenced by generating extensional viscosity plots (FIGS. 2 to 5) using a Rheo-tester™ 1000 capillary rheometer in conjunction with a wheel-driven Rheotens™ 71.97 extensional rheometer, where the capillary rheometer was set at a temperature of 190° C., the die a 30/2 (mm) ratio die, the piston speed at 0.28 mm/s, and the shear rate at 40 sec⁻¹, and where the strand (vertical) had a length of 100 mm, set at a velocity of 10 mm/s. For the measurement of the extensional viscosity, the extensional rheometer had a gap of 0.7 mm using a grooved wheel at an acceleration of 12 mm/s². The velocity of the rotating rollers increased at a constant acceleration rate until the polymer melt breaks, if at all. To anneal, a polypropylene sample is heated to about 200° C. for 3 min to melt the polypropylene without pressure. Then, 1500 psi pressure is applied while the sample was kept heated for another 3 min between two plates. Afterwards, the pressure applied to the sample is removed while the sample was kept heated at 200° C. for another 20 min. After 20 min, the sample is cooled down with water circulation without any pressure applied for additional 20 min to a temperature of 20° C.

Methodology.

Polypropylene (hPP) having an Mz/Mw of at least 4 and an Mw/Mn of at least 8 with a melt flow rate of about 6 g/10 min was produced in loop-slurry polymerization reactor by contacting propylene with Avant™ ZN168 catalyst (Equistar Chemical Company), triethylaluminum (TEAL), and propyltriethoxysilane and dicyclopentyldimethoxysilane as external donors, and hydrogen to the desired MFR. The reactor was operated as a single stage in that the conditions of hydrogen, temperature, external electron donor, and pressure were constant throughout. Exemplary reactor conditions are as shown in Table 1.

TABLE 1

Loop-Slurry Polymerization Reactor Conditions

| parameter | value |
| --- | --- |
| External donors (wppm in propylene) | 30 |
| TEAL (wppm in propylene) | 50 |
| $H_2$ concentration (mppm) | 8,000 |
| reaction temperature (° C.) | 70 |

The polypropylene granules from the reactor were conveyed directly without cooling to a homogenizer comprising a multiple-paddle rotating mixer along its interior length of about 35 feet. The homogenizer was equipped with heaters to allow further heating. The polypropylene granules were kept in the presence of a flow of nitrogen to displace air. Various amounts of a solid, flaked organic peroxide, Perkadox 24L™ organic peroxide (dicetyl peroxydicarbonate, Akzo Nobel), were added to the granules in the homogenizer and maintained for a residence time of at least 60 seconds until conveyed to the feed throat of a twin-screw extruder that melt blended the solid materials. Addition of the organic peroxide occurred in at least one position along the length of the homogenizer, and in some instances two or three positions along the length of the homogenizer, at least two of which create a mixture of polypropylene granules and organic peroxide with different residence times. The output of the homogenizer was from about 90,000 to 113,000 lbs/hr.

Example 1—Heated Granules

Tests were performed on the hPP with an MFR of 6 g/10 min and having the following additives:
1500 ppm Irgafos™ 168
1500 ppm Irganox™ 1010
375 ppm calcium stearate
375 ppm DHT4V
150 ppm Irganox™ ™ E-201
78 ppm Pationic™ 901 (GMS)

It was found that when a 6 MFR hPP made as described above was homogenized for 75 or 92 seconds with 1.4 wt % (by weight of the polymer and organic peroxide) of Perkadox, the MFR dropped to about 2 g/10 min at a temperature of 70° C. At 70° C. (the granule temperature), the half-life of Perkadox™ organic peroxide is about 1800 seconds, thus it is likely that the variability of the lab melt flow rate measurements is greater than the difference between the two residence times, or that the act of melt blending cancels these differences out.

Example 2—Solid-Solid Reaction

The MFR of the product is measured after homogenization but prior to entering the melt extruder. The MFR of the polypropylene product, the polypropylene granules that have reacted with the solid Perkadox™ organic peroxide, was less than the original 6 MFR hPP granules, typically 4 MFR or less. For homogenizing times of less than 75 seconds, the MFR decreases less than when the homogenizing times are 75 seconds and greater.

Example 3—Level of Organic Peroxide

Figure 1:
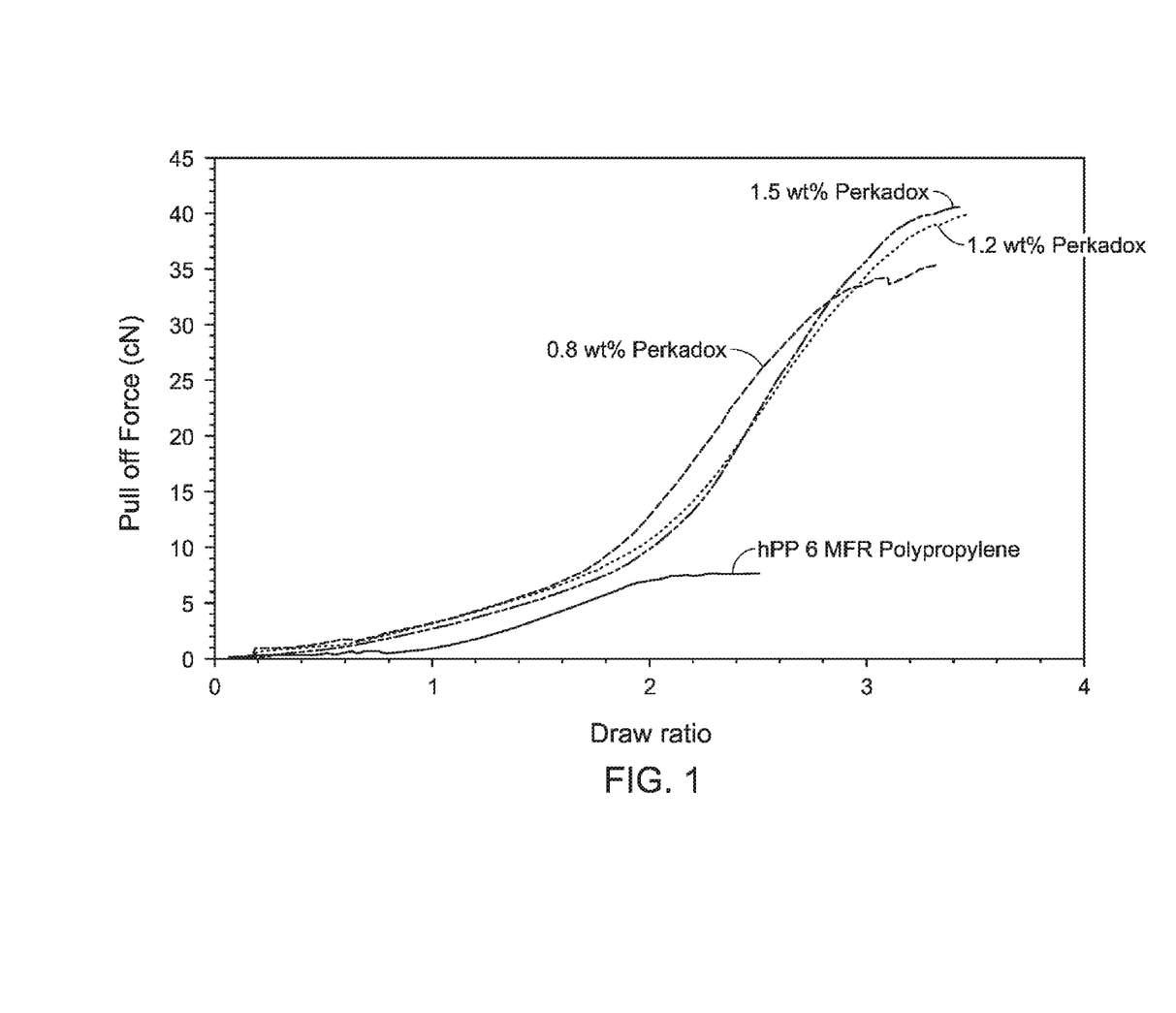
FIG. 1 is an extensional viscosity plot of pull-off force (melt strength) as a function of draw ratio for various exemplary samples.
Figure 2:
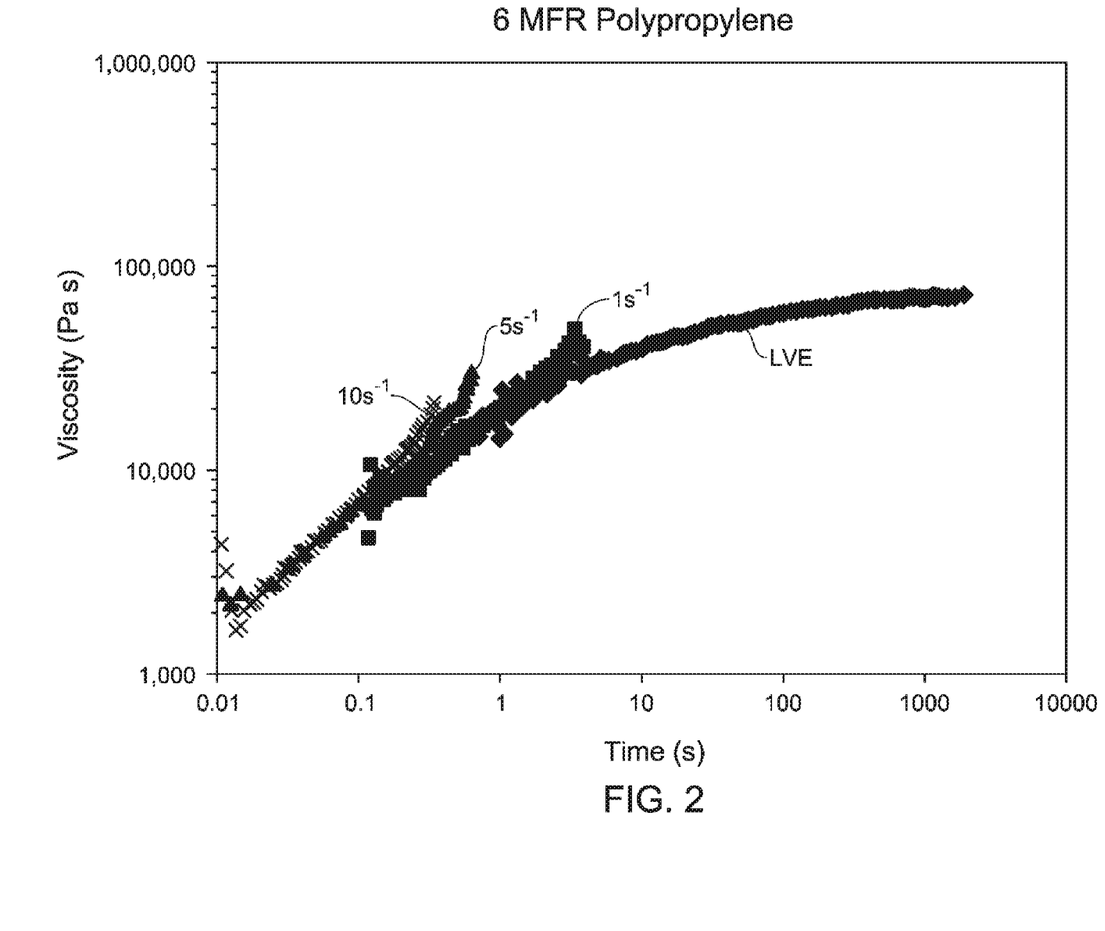
FIG. 2 is an extensional viscosity plot (190° C.) of the 6 MFR reactor grade polypropylene prior to being treated with the organic peroxide.
Figure 3:
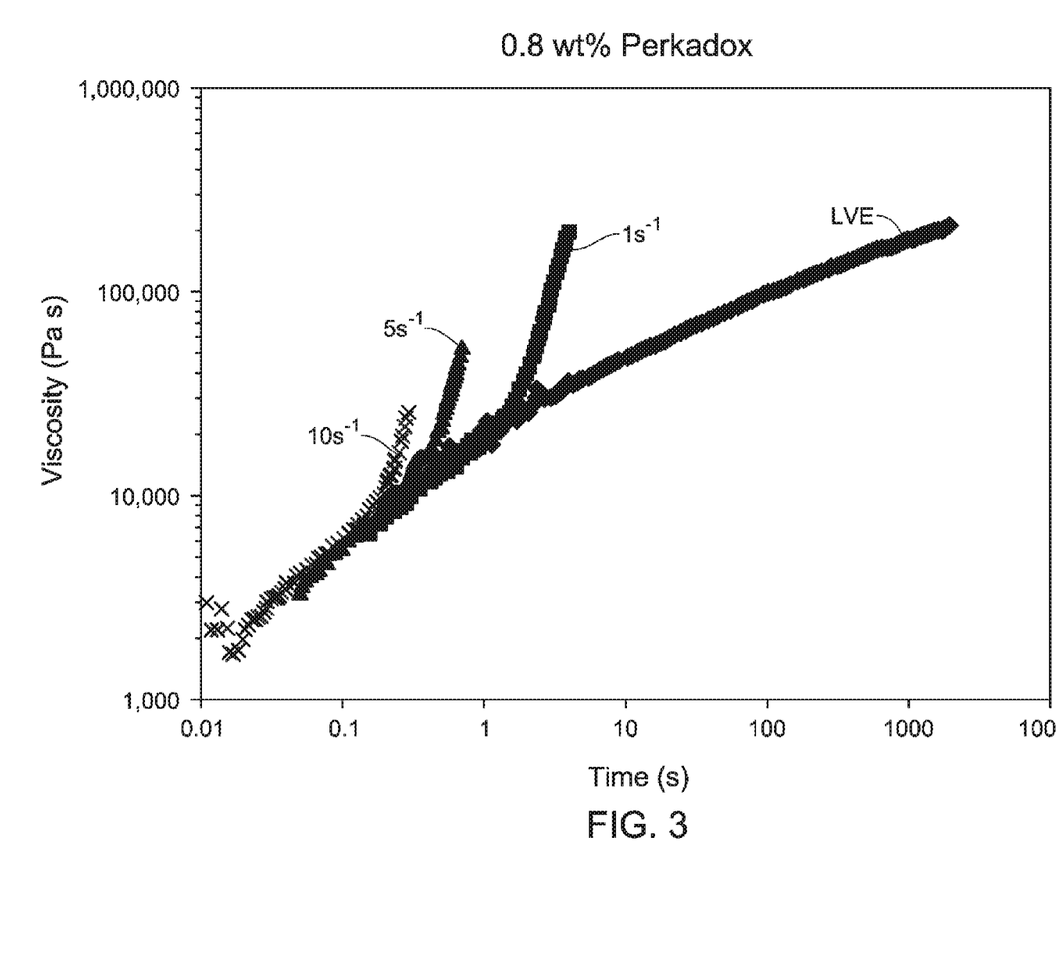
FIG. 3 is an extensional viscosity plot of the 2 MFR polypropylene after having been treated with 0.8 wt % of the organic peroxide by homogenization and melt extrusion.
Figure 4:
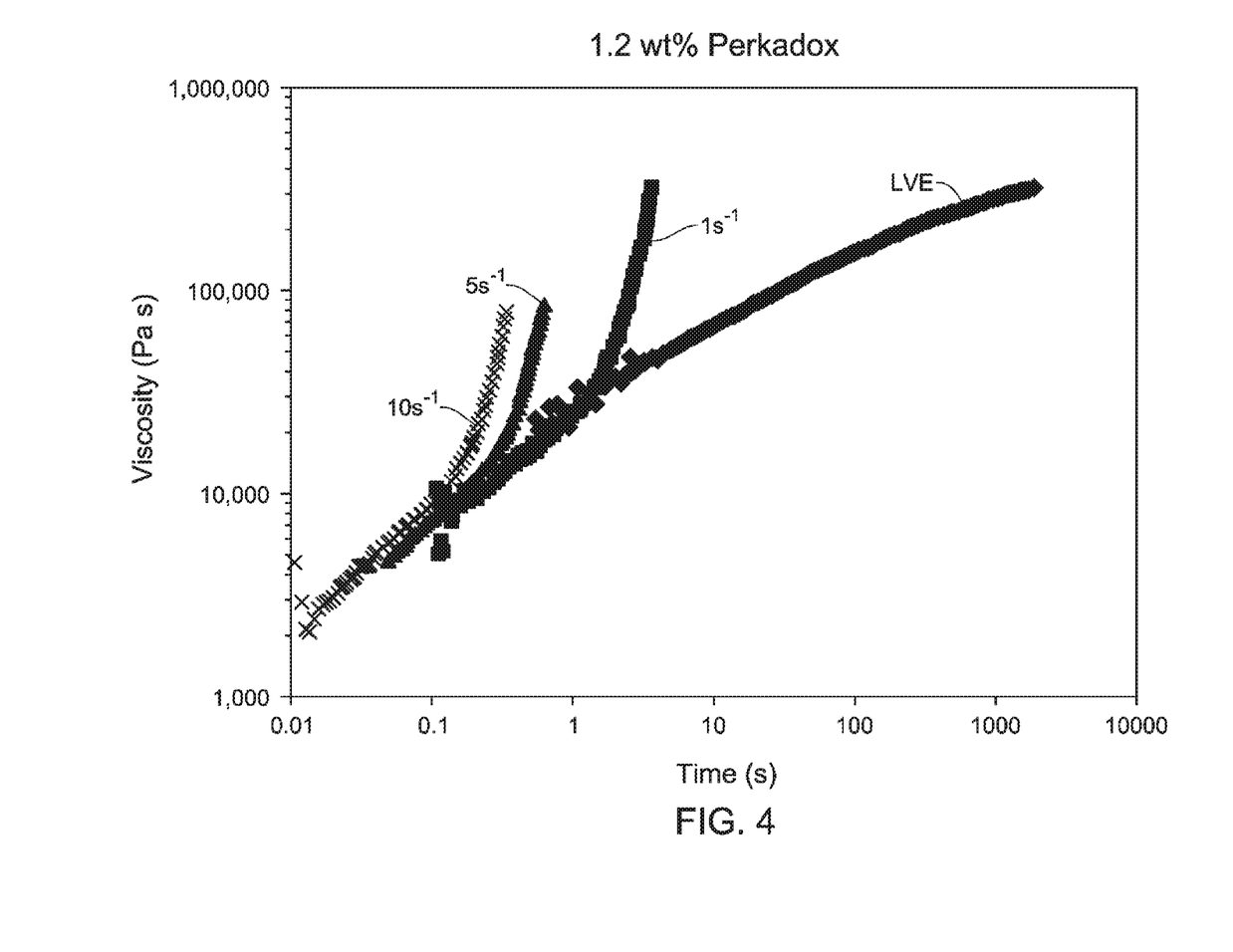
FIG. 4 is an extensional viscosity plot of the 2 MFR polypropylene after having been treated with 1.2 wt % of the organic peroxide.
Figure 5:
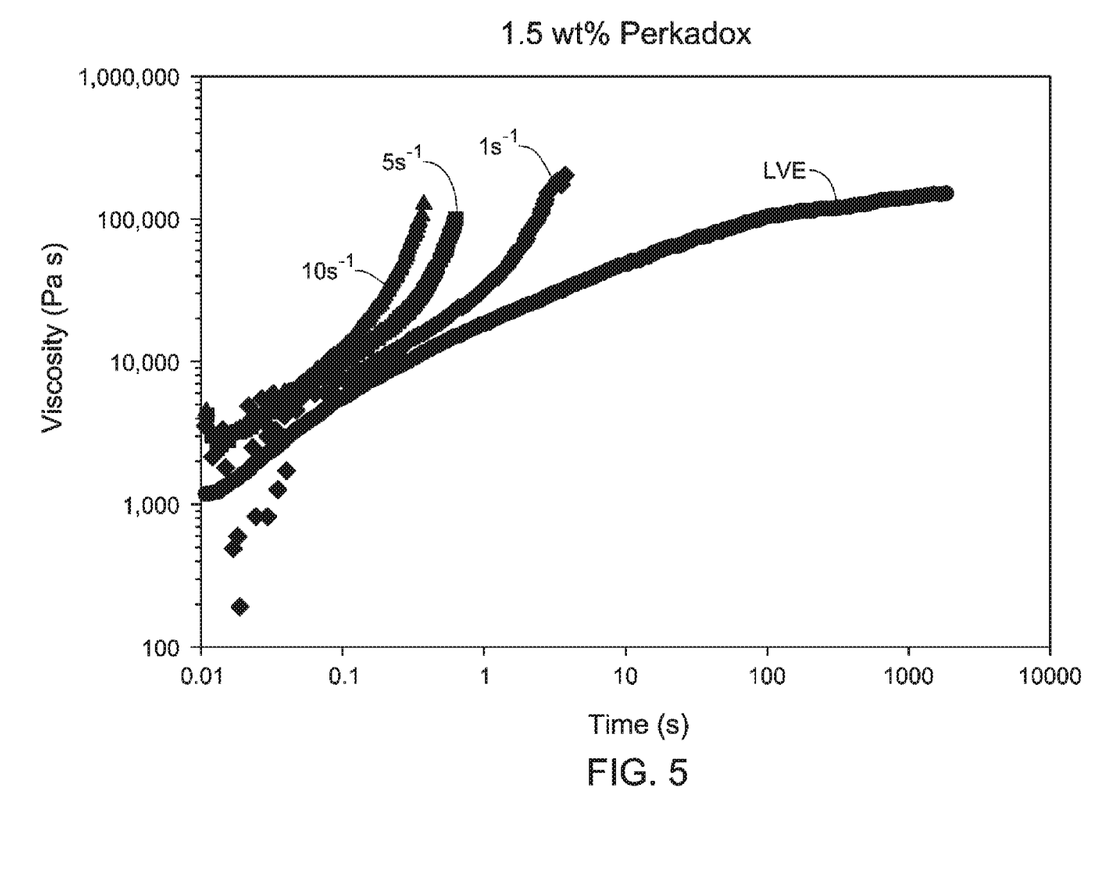
FIG. 5 is an extensional viscosity plot of the 2 MFR polypropylene after having been treated with 1.5 wt % of the organic peroxide.

Further studies were carried out to determine the effect of the level of organic peroxide added to the hPP to the final, melt extruded polypropylene pellets. The same 6 MFR granules were homogenized as above with various amounts of Perkadox™ organic peroxide, the amounts listed in Table 2. The amounts are by weight of the organic peroxide and polypropylene. The results summarized in FIG. 1 demonstrate that the melt strength (pull-off-force) is only decreases slightly in going from 1.5 wt % organic peroxide to 0.8 wt % organic peroxide. Extensional viscosity plots of the Rheotens study in FIGS. 2 to 5 confirm strain hardening behavior of the polypropylene pellets even using the lowest amount of Perkadox™ organic peroxide. The strain hardening index (SHI) for each example was calculated and presented in Table 2, calculated at a strain rate of 1 $sec^{-1}$ as described above.

TABLE 2

Strain Hardening Index of Polypropylene Pellets, 190° C.

| Amount of Organic Peroxide (wt %) | SHI ($\varepsilon_3/\varepsilon_1$) |
| --- | --- |
| — | 1.8 |
| 0.8 | 6.4 |
| 1.2 | 7.1 |
| 1.5 | 5.0 |

Any polymer and/or articles made from the pellets or processes herein can include "additives" to a level up to 5, or 4, or 3, or 2 wt % by weight of the composition. Such additional additives can include, for example, fillers, nucleators or clarifiers, colorants, antioxidants, alkyl-radical scavengers (preferably vitamin E, or other tocopherols and/or tocotrienols), anti-UV agents, foaming agents, acid scavengers, curatives and cross-linking agents, aliphatic and/or cyclic containing oligomers or polymers (often referred to as hydrocarbon resins), elastomers such as Vistamaxx™ propylene-based elastomers, and other additives well known in the art.

As it relates to a process, the phrase "consisting essentially of" means that there are no other process features, solvents, temperature changes, or mechanical manipulations that will alter the claimed properties of the polymer, polymer blend or article produced therefrom by any more than 10, 15 or 20%, but there may otherwise be other process features not named.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:
1. A process comprising:
    combining a polymerization catalyst with propylene at a polymerization temperature to produce polypropylene granules having an MFR1, wherein the temperature of the polypropylene granules is maintained at least at the polymerization temperature;

mixing the polypropylene granules with an organic peroxide at a temperature of at least the polymerization temperature for a residence time of at least 40 seconds at a temperature below the melting point temperature of the polypropylene granules to form a polypropylene product having an MFR2;

wherein MFR1 is greater than MFR2.

2. The process of claim 1, further comprising melt blending the polypropylene product at a temperature of at least the melting point temperature of the polypropylene product to form polypropylene pellets.

3. The process of claim 1, wherein cooling is absent.

4. The process of claim 1, wherein the mixing step takes place after the combining step without cooling the polypropylene granules.

5. The process of claim 1, wherein the organic peroxide is in the form of solid granules.

6. The process of claim 1, wherein the amount of organic peroxide is within a range from 0.4 wt % to 1.5 wt % by weight of the polypropylene granules and organic peroxide.

7. The process of claim 1, wherein the mixing occurs in the presence of an inert gas.

8. The process of claim 1, wherein the mixing occurs in a homogenizer at a rate of at least 50,000 lbs of polymer/hour.

9. The process of claim 1, wherein the average particle size of the polypropylene granules is reduced from an average diameter of at least 1500 micrometers or more to an average diameter of less than 1000 micrometers.

10. The process of claim 1, comprising heating the polypropylene granules to a temperature within a range from 50° C. to 100° C. prior to mixing with the organic peroxide.

11. The process of claim 1, wherein bifunctional agents are absent.

12. The process of claim 2, wherein the polypropylene pellets have a melt strength (pull-off-force) of at least 25 cN.

13. The process of claim 12, wherein the polypropylene granules have a branching index (g'vis) of greater than 0.97, and wherein the polypropylene product has a g'vis value of 0.97 or less.

14. A process comprising forming a foamed article from the polypropylene pellets of claim 2.

15. A process comprising combining a polymerization catalyst with propylene at a polymerization temperature to produce polypropylene granules having an MFR1, wherein the temperature of the polypropylene granules is maintained at least at the polymerization temperature; conveying the polypropylene granules to a homogenizer while maintaining the temperature of the granules at a temperature of at least the polymerization temperature; and mixing the polypropylene granules with an organic peroxide in the homogenizer for a residence time of at least 40 seconds at a temperature below the melting point temperature of the polypropylene granules to form a polypropylene product having an MFR2.

16. The process of claim 15, further comprising melt blending the polypropylene product at a temperature of at least the melting point temperature of the polypropylene product to form polypropylene pellets.

17. The process of claim 15, wherein cooling is absent.

18. The process of claim 15, wherein the mixing step takes place after the combining step without cooling the polypropylene granules.

19. The process of claim 15, wherein the organic peroxide is in the form of solid granules.

20. The process of claim 15, wherein the amount of organic peroxide is within a range from 0.4 wt % to 1.5 wt % by weight of the polypropylene granules and organic peroxide.

21. The process of claim 15, wherein the mixing occurs in the presence of an inert gas.

22. The process of claim 15, wherein the mixing occurs in a homogenizer at a rate of at least 50,000 lbs of polymer/hour.

23. The process of claim 15, wherein the average particle size of the polypropylene granules is reduced from an average diameter of at least 1500 micrometers or more to an average diameter of less than 1000 micrometers.

24. The process of claim 15, comprising heating the polypropylene granules to a temperature within a range from 50° C. to 100° C. prior to mixing with the organic peroxide.

25. The process of claim 15, wherein bifunctional agents are absent.

* * * * *